United States Patent
Downs et al.

(10) Patent No.: US 9,789,662 B2
(45) Date of Patent: Oct. 17, 2017

(54) ENGINEERED COMPOSITE SYSTEMS

(71) Applicant: Cubic Tech Corporation, Mesa, AZ (US)

(72) Inventors: Roland Joseph Downs, Mesa, AZ (US); Christopher Michael Adams, Mesa, AZ (US); Jon Michael Holweger, Queen Creek, AZ (US); Wesley Edward Hatcher, Mesa, AZ (US); Keith Joel McDaniels, Phoenix, AZ (US)

(73) Assignee: Cubic Tech Corporation, Mesa, AZ (US)

( * ) Notice: Subject to any disclaimer, the term of this patent is extended or adjusted under 35 U.S.C. 154(b) by 416 days.

(21) Appl. No.: 14/207,790

(22) Filed: Mar. 13, 2014

(65) Prior Publication Data

US 2014/0308510 A1   Oct. 16, 2014

Related U.S. Application Data

(60) Provisional application No. 61/780,345, filed on Mar. 13, 2013.

(51) Int. Cl.
  *B32B 5/12*   (2006.01)
  *B32B 5/02*   (2006.01)
  *B32B 27/12*  (2006.01)
  *B32B 27/40*  (2006.01)

(52) U.S. Cl.
  CPC ............ *B32B 5/12* (2013.01); *B32B 5/022* (2013.01); *B32B 5/024* (2013.01); *B32B 5/026* (2013.01); *B32B 27/12* (2013.01); *B32B 27/40* (2013.01); *B32B 2307/7242* (2013.01); *B32B 2307/7265* (2013.01); *Y10T 428/249947* (2015.04)

(58) Field of Classification Search
  CPC  B32B 5/024; B32B 5/026; B32B 5/12; Y10T 428/249947
  USPC ...................................... 428/299.7
  See application file for complete search history.

(56) References Cited

U.S. PATENT DOCUMENTS

| | | |
|---|---|---|
| 1,287,945 A | 12/1918 | Ford |
| 2,232,640 A | 2/1941 | Schwartzman |
| 2,522,346 A | 9/1950 | Carson |
| 2,584,632 A | 2/1952 | Southwick |
| 2,679,194 A | 5/1954 | Ehrenfried |
| 2,748,048 A | 5/1956 | Russel |
| 3,335,045 A | 8/1967 | Post |
| 3,644,165 A | 2/1972 | Chen |
| 4,565,714 A | 1/1986 | Koshar |

(Continued)

FOREIGN PATENT DOCUMENTS

| | | |
|---|---|---|
| CN | 1727571 | 2/2006 |
| CN | 101723067 | 6/2010 |

(Continued)

OTHER PUBLICATIONS

U.S. Appl. No. 13/168,912, filed Jun. 24, 2011, Waterproof Breathable Composite Materials for Fabrication of Flexible Membranes and Other Articles.

(Continued)

*Primary Examiner* — Arti Singh-Pandey
(74) *Attorney, Agent, or Firm* — Snell & Wilmer L.L.P.

(57) ABSTRACT

A system for providing improved engineered-composite materials, equipment, and manufacturing processes.

25 Claims, 1 Drawing Sheet

Figure 1A:
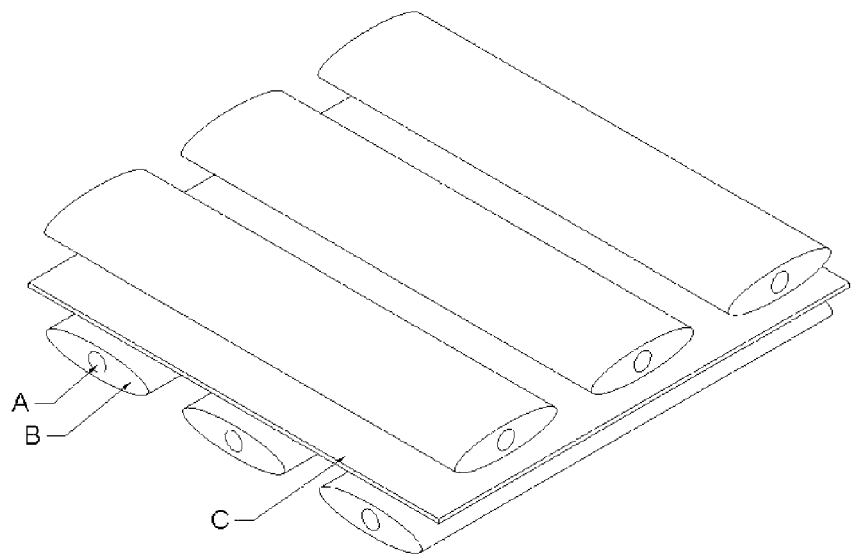

Figure for S06 where A is the fiber, B is the matrix and C is the woven material, note there is no top or bottom coating.

Figure for S07 and S13 where A is the fiber and B is the matrix material. C in this Figure preferably comprises a waterproof non-breathable urethane film.

(56) References Cited

U.S. PATENT DOCUMENTS

| | | |
|---|---|---|
| 4,588,538 A | 5/1986 | Chung et al. |
| 4,637,851 A | 1/1987 | Ueno |
| 4,679,519 A | 7/1987 | Linville |
| 4,708,080 A | 11/1987 | Conrad |
| 4,757,742 A | 7/1988 | Mazelsky |
| 4,762,751 A | 8/1988 | Girgis et al. |
| 4,803,029 A | 2/1989 | Iversen |
| 4,806,400 A | 2/1989 | Sancktar |
| 4,991,317 A | 2/1991 | Lakic |
| 5,001,003 A | 3/1991 | Mahr |
| 5,025,575 A | 6/1991 | Lakic |
| 5,094,883 A | 3/1992 | Muzzy et al. |
| 5,106,568 A | 4/1992 | Honka |
| 5,167,876 A | 12/1992 | Lem |
| 5,173,138 A | 12/1992 | Blauch |
| 5,279,879 A | 1/1994 | Takezawa |
| 5,333,568 A | 8/1994 | Meldner et al. |
| 5,403,641 A | 4/1995 | Linville et al. |
| 5,419,726 A | 5/1995 | Switlik |
| 5,470,632 A | 11/1995 | Meldner et al. |
| 5,514,431 A | 5/1996 | Shimomura |
| 5,591,933 A | 1/1997 | Li et al. |
| 5,729,834 A | 3/1998 | Sloot |
| 5,922,161 A | 7/1999 | Wu et al. |
| 5,940,991 A | 8/1999 | Cabalquinto |
| 6,014,823 A | 1/2000 | Lakic |
| 6,048,622 A | 4/2000 | Hagood |
| 6,071,834 A | 6/2000 | Martz |
| 6,168,855 B1 | 1/2001 | Cohen |
| 6,224,951 B1 | 5/2001 | Centanni et al. |
| 6,361,642 B1 | 3/2002 | Bellamy et al. |
| 6,565,944 B1 | 5/2003 | Hartness et al. |
| 6,627,034 B1 | 9/2003 | Ufer |
| 6,761,795 B2 | 7/2004 | Chapuis et al. |
| 6,846,548 B2 | 1/2005 | Harpell et al. |
| 7,156,787 B2 | 1/2007 | Kemery et al. |
| 7,226,878 B2 | 6/2007 | Wagner et al. |
| 7,601,416 B2 | 10/2009 | Palley |
| 7,622,014 B2 | 11/2009 | Millette |
| 7,892,374 B2 | 2/2011 | Pekar |
| 7,985,463 B2 | 7/2011 | Stowell et al. |
| 8,080,487 B2 | 12/2011 | Gardner et al. |
| 8,147,644 B2 | 4/2012 | Tippins |
| 8,256,019 B2 | 9/2012 | Ardiff et al. |
| 8,343,574 B2 | 1/2013 | Downs et al. |
| 8,540,838 B2 | 9/2013 | Millette |
| 8,572,786 B2 | 11/2013 | Davis et al. |
| 8,784,968 B2 | 7/2014 | Adams et al. |
| 8,802,189 B1 | 8/2014 | Downs et al. |
| 9,079,218 B2 | 7/2015 | Downs et al. |
| 9,114,570 B2 | 8/2015 | Downs et al. |
| 9,154,593 B1 | 10/2015 | Meldner |
| 9,339,842 B2 | 5/2016 | Downs et al. |
| 9,358,755 B2 | 6/2016 | Adams et al. |
| 2002/0182955 A1 | 12/2002 | Weglewski et al. |
| 2003/0022578 A1 | 1/2003 | Lubker, II |
| 2003/0064188 A1 | 4/2003 | Patel et al. |
| 2004/0012118 A1 | 1/2004 | Perez |
| 2004/0084138 A1 | 5/2004 | Henke et al. |
| 2004/0102125 A1 | 5/2004 | Morman et al. |
| 2004/0171321 A1 | 9/2004 | Plant |
| 2005/0112968 A1 | 5/2005 | Panse |
| 2006/0191427 A1 | 8/2006 | Geddes et al. |
| 2007/0184263 A1 | 8/2007 | Rodewald et al. |
| 2007/0278155 A1 | 12/2007 | Lo et al. |
| 2008/0081171 A1 | 4/2008 | DuPont |
| 2008/0116043 A1 | 5/2008 | Chahal et al. |
| 2008/0230173 A1 | 9/2008 | Cho et al. |
| 2009/0042471 A1 | 2/2009 | Cashin et al. |
| 2009/0169825 A1 | 7/2009 | Farmer et al. |
| 2009/0169835 A1 | 7/2009 | Stowell et al. |
| 2009/0218672 A1 | 9/2009 | Nakamura |
| 2010/0028593 A1 | 2/2010 | Taketa et al. |
| 2010/0152654 A1 | 6/2010 | Tilson et al. |
| 2010/0168704 A1 | 7/2010 | Thomas et al. |
| 2010/0304072 A1 | 12/2010 | Alvelind |
| 2011/0312238 A1 | 12/2011 | Bader et al. |
| 2012/0100334 A1* | 4/2012 | Adams .................. 428/109 |
| 2012/0118615 A1 | 5/2012 | Lee et al. |
| 2012/0169552 A1 | 7/2012 | Lee |
| 2012/0174753 A1 | 7/2012 | Wagner et al. |
| 2012/0186430 A1 | 7/2012 | St. Claire et al. |
| 2012/0270454 A1 | 10/2012 | Chiou |
| 2012/0276380 A1 | 11/2012 | Traser et al. |
| 2013/0126533 A1 | 5/2013 | Klosky |
| 2014/0087616 A1 | 3/2014 | Adams et al. |
| 2014/0119703 A1 | 5/2014 | Hinaga |
| 2014/0134378 A1 | 5/2014 | Downs et al. |
| 2014/0308510 A1 | 10/2014 | Downs et al. |
| 2014/0311329 A1 | 10/2014 | Dyke et al. |
| 2014/0335750 A1 | 11/2014 | Adams et al. |
| 2014/0363615 A1 | 12/2014 | Adams et al. |
| 2015/0010706 A1 | 1/2015 | Downs et al. |
| 2015/0082976 A1 | 3/2015 | Downs et al. |
| 2015/0083473 A1 | 3/2015 | Downs et al. |
| 2015/0266053 A1 | 9/2015 | Downs et al. |
| 2016/0001472 A1 | 1/2016 | Downs et al. |
| 2016/0023428 A1 | 1/2016 | Adams et al. |
| 2016/0031164 A1 | 2/2016 | Downs et al. |
| 2016/0033236 A1 | 2/2016 | Meldner et al. |
| 2016/0037633 A1 | 2/2016 | Downs et al. |

FOREIGN PATENT DOCUMENTS

| | | |
|---|---|---|
| DE | 4010086 | 11/1990 |
| DE | 202011004434 | 6/2011 |
| EP | 0361796 | 4/1990 |
| EP | 0515992 | 12/1992 |
| EP | 0579047 | 1/1994 |
| EP | 0699877 | 3/1996 |
| EP | 0967071 | 12/1999 |
| EP | 1582107 | 10/2005 |
| EP | 2133464 | 12/2009 |
| GB | 2051674 | 1/1981 |
| JP | 57027738 | 2/1928 |
| JP | 01123727 | 5/1989 |
| JP | H0446202 | 7/1992 |
| JP | 2000234257 | 8/2000 |
| JP | 2002539036 | 11/2002 |
| JP | 2004218170 | 8/2004 |
| JP | 2006322077 | 11/2006 |
| JP | 2007135213 | 5/2007 |
| JP | 2007321652 | 12/2007 |
| JP | 2008274516 | 11/2008 |
| JP | 2011245745 | 12/2011 |
| WO | 8809630 | 12/1988 |
| WO | 9411185 | 5/1994 |
| WO | 9830397 | 7/1998 |
| WO | 0002427 | 1/2000 |
| WO | 0051458 | 9/2000 |
| WO | 0128196 | 4/2001 |
| WO | 0247899 | 6/2002 |
| WO | 03005684 | 1/2003 |
| WO | 2005025841 | 3/2005 |
| WO | 2007122009 | 11/2007 |
| WO | 2008116702 | 10/2008 |
| WO | 2009036139 | 3/2009 |
| WO | 2009059402 | 5/2009 |
| WO | 2011076914 | 6/2011 |
| WO | 2011163643 | 12/2011 |
| WO | 2012017233 | 2/2012 |
| WO | 2012018959 | 2/2012 |
| WO | 2012150169 | 11/2012 |
| WO | 2014044688 | 3/2014 |
| WO | 2014047227 | 3/2014 |
| WO | 2014047663 | 3/2014 |
| WO | 2014084947 | 6/2014 |
| WO | 2014074966 | 7/2014 |
| WO | 2014160483 | 10/2014 |
| WO | 2014160492 | 10/2014 |

(56) References Cited

FOREIGN PATENT DOCUMENTS

WO  2014160498  10/2014
WO  2014160506  10/2014

OTHER PUBLICATIONS

U.S. Appl. No. 14/309,578, filed Jun. 19, 2014, Waterproof Breathable Composite Materials for Fabrication of Flexible Membranes and Other Articles.
U.S. Appl. No. 13/197,741, filed Aug. 3, 2011, System and Method for the Transfer of Color and Other Physical Properties to Laminate Composite Materials and Other Articles.
U.S. Appl. No. 14/031,040, filed Sep. 18, 2013, Flexible Composite Systems.
U.S. Appl. No. 14/430,340, filed Mar. 23, 2015, Adherable Flexible Composite Systems.
U.S. Appl. No. 14/076,201, filed Nov. 9, 2013, Systems and Method for Producing Three-Dimensional Articles From Flexible Composite Materials.
U.S. Appl. No. 14/791,025, filed Jul. 2, 2015, Systems and Method for Producing Three-Dimensional Articles From Flexible Composite Materials.
U.S. Appl. No. 13/727,919, filed Dec. 27, 2012, System and Method for the Transfer of Color and Other Physical Properties to Laminate Composite Materials and Other Articles.
U.S. Appl. No. 14/326,261, filed Jul. 8, 2014, System and Method for the Transfer of Color and Other Physical Properties to Laminate Composite Materials and Other Articles.
U.S. Appl. No. 14/732,210, filed Jun. 5, 2015, System and Method for the Transfer of Color and Other Physical Properties to Laminate Composite Materials and Other Articles.
U.S. Appl. No. 14/774,490, filed Sep. 10, 2015, Systems and Method for Producing Three-Dimensional Articles From Flexible Composite Materials.
U.S. Appl. No. 14/774,562, filed Sep. 10, 2015, Light-Weight Semi-Rigid Composite Anti-Ballistic Systems With Engineered Compliance and Rate-Sensitive Impact Response.
U.S. Appl. No. 14/208,017, filed Mar. 13, 2014, Light-Weight Semi-Rigid Composite Anti-Ballistic Systems With Engineered Compliance and Rate-Sensitive Impact Response.
U.S. Appl. No. 14/774,581, filed Sep. 10, 2015, Flexible Composite Systems and Methods.
U.S. Appl. No. 14/207,891, filed Mar. 13, 2014, Flexible Composite Systems.
U.S. Appl. No. 14/774,594, filed Sep. 10, 2015, Flexible Electronic Fiber-Reinforced Composite Materials.
U.S. Appl. No. 14/208,107, filed Mar. 13, 2014, Flexible Electronic Fiber-Reinforced Composite Materials.
U.S. Appl. No. 13/922,128, filed Jun. 19, 2013, Flotation and Related Integrations to Extend the Use of Electronic Systems.
USPTO; Non-Final Office Action dated Jan. 14, 2015 in U.S. Appl. No. 13/922,128.
USPTO; Restriction Requirement dated Feb. 9, 2015 in U.S. Appl. No. 14/031,040.
EPO; European Search Report dated Jan. 7, 2015 in Application No. EP 11799030.9.
USPTO; Final Office Action dated Nov. 25, 2015 in U.S. Appl. No. 14/031,040.
USPTO; Non-Final Office Action dated Jun. 3, 2016 in U.S. Appl. No. 14/031,040.
USPTO; Non-Final Office Action dated Jan. 6, 2016 in U.S. Appl. No. 14/309,578.
USPTO; Notice of Allowance dated Feb. 8, 2016 in U.S. Appl. No. 14/309,578.
USPTO; Notice of Allowance dated Jan. 21, 2016 in U.S. Appl. No. 14/732,210.
USPTO; Non-Final Office Action dated Feb. 2, 2016 in U.S. Appl. No. 14/774,562.
EPO; Extended Search Report dated Feb. 19, 2016 in Application No. EP 11815290.9.
EPO; European Search Report dated May 3, 2016 in Application 13839426.7.
EPO; European Search Report dated Jun. 8, 2016 in Application No. 13838954.9.
EPO; European Search Report dated Jun. 28, 2016 in Application No. 13853204.9.
PCT; International Search Report and Written Opinion dated Jul. 4, 2016 in Application No. PCT/IB2016/000568.
USPTO; Non-Final Office Action dated Nov. 18, 2016 in U.S. Appl. No. 14/207,790.
USPTO; Non-Final Office Action dated Sep. 9, 2016 in U.S. Appl. No. 14/208,107.
USPTO; Final Office Action dated Apr. 28, 2017 in U.S. Appl. No. 14/208,107.
USPTO; Non-Final Office Action dated Oct. 4, 2016 in U.S. Appl. No. 14/430,340.
USPTO; Final Office Action dated Dec. 1, 2016 in U.S. Appl. No. 14/774,562.
USPTO; Non-Final Office Action dated May 1, 2017 in U.S. Appl. No. 14/774,594.
USPTO; Non-Final Office Action dated Apr. 4, 2017 in U.S. Appl. No. 14/791,025.
USPTO; Non-Final Office Action dated Mar. 10, 2017 in U.S. Appl. No. 14/207,891.
PCT; International Search Report and Written Opinion dated Aug. 26, 2016 in Application No. PCT/IB2016/000919.
Chawla, "Composite Materials" Science and Engineering, Third Edition, Springer, 7-68 (2012).
Sanborn et al., "Tensile Prperties of Dyneema SK76 Single Fibers at Multiple Loading Rates Using a Dirct Gripping Method", J. Dynamic Behavior Mater. 2: 4-14 (2015).
USPTO; Non-Final Office Action dated Sep. 10, 2013 in U.S. Appl. No. 13/168,912.
USPTO; Notice of Allowance dated Mar. 21, 2014 in U.S. Appl. No. 13/168,912.
USPTO; Office Action dated Mar. 21, 2012 in U.S. Appl. No. 13/197,741.
USPTO; Notice of Allowance dated Oct. 4, 2012 in U.S. Appl. No. 13/197,741.
USPTO; Office Action dated Jul. 17, 2013 in U.S. Appl. No. 13/727,919.
USPTO; Office Action dated Dec. 20, 2013 in U.S. Appl. No. 13/727,919.
USPTO; Advisory Action dated Jan. 28, 2014 in U.S. Appl. No. 13/727,919.
USPTO; Notice of Allowance dated Apr. 11, 2014 in U.S. Appl. No. 13/727,919.
USPTO; Restriction Requirement dated Aug. 25, 2014 in U.S. Appl. No. 14/076,201.
USPTO; Non-Final Office Action dated Nov. 19, 2014 in U.S. Appl. No. 14/326,261.
PCT; International Search Report dated Feb. 10, 1994 in Application No. PCT/US1993/011425.
PCT; International Search Report dated Oct. 31, 2011 in Application No. PCT/US2011/041914.
PCT; Written Opinion of the International Search Authority dated Oct. 31, 2011 in Application No. PCT/US2011/041914.
PCT; International Preliminary Report on Patentability dated May 17, 2012 in Application No. PCT/US2011/041914.
PCT; International Search Report dated Dec. 16, 2011 in Application No. PCT/US2011/046497.
PCT; Written Opinion of the Intenational Searching Authority dated Dec. 16, 2011 in Application No. PCT/US2011/046497.
PCT; International Preliminary Report on Patentability dated Aug. 2, 2012 in Application No. PCT/US2011/046497.
PCT; International Search Report and Written Opinion dated Feb. 21, 2014 in Application No. PCT/US2013/061509.
PCT; International Search Report and Written Opinion dated Feb. 28, 2014 in Application No. PCT/US2013/060487.
PCT; International Search Report and Written Opinion dated May 7, 2014 in Application No. PCT/US2013/069364.

(56) References Cited

OTHER PUBLICATIONS

PCT; International Search Report and Written Opinion dated Aug. 14, 2014 in Application No. PCT/US2014/026796.
PCT; International Search Report and Written Opinion dated Aug. 11, 2014 in Application No. PCT/US2014/026828.
PCT; International Search Report and Written Opinion dated Aug. 20, 2014 in Application No. PCT/US2014/026856.
PCT; International Search Report and Written Opinion dated Dec. 11, 2014 in Application No. PCT/US2014/026870.
EPO; Supplementary European Search Report dated Jul. 27, 1995 in Application No. EP 94902379.
EPO; Office Action dated Apr. 4, 1997 in Application No. EP 94902379.
EPO; Office Action dated Jul. 22, 1998 in Application No. EP 94902379.
EPO; Office Action dated Jun. 17, 1999 in Application No. EP 94902379.
EPO; Office Action dated Aug. 17, 2000 in Application No. EP 94902379.
CPO; Office Action dated Apr. 2, 2014 in Application No. CN 201180037975.6.
CPO; Office Action dated Jun. 6, 2014 in Application No. CN 201180031205.0.
CPO; Office Action dated Oct. 8, 2014 in Application No. CN 201180031205.0.
CPO; Office Action dated Nov. 15, 2014 in Application No. CN 201180037975.6.
USPTO; Notice of Allowance dated Jun. 1, 2015 in U.S. Appl. No. 13/922,128.
USPTO; Non-Final Office Action dated May 8, 2015 in U.S. Appl. No. 14/031,040.
USPTO; Notice of Allowance dated Apr. 24, 2015 in U.S. Appl. No. 14/076,201.
USPTO; Non-Final Office Action dated Jul. 17, 2015 in U.S. Appl. No. 14/208,017.
USPTO; Notice of Allowance dated Mar. 10, 2015 in U.S. Appl. No. 14/326,261.
USPTO; Non-Final Office Action dated Jul. 30, 2015 in U.S. Appl. No. 14/732,210.
Braila, "Handbook of Manufacturing Processes—How Products, Compotents and Materials are Made," Industrial Press, pp. 411, (2007).
eFunda, "Polymers Sorted by Thermoplastic/ Thermoset," pp. 1-2, (2008).
Elaldi et al., "Machining and Joining Process," Smithers Rapra Technology, 7, pp. 163-181, (2001).
Huntsman, "Modification of Polyolefins with Elastaminc Polyetheramines," pp. 1-3, (2009).
Schaefer, "Nip Rolls," pp. 1, (2009).
Tomsic, "Dictionary of Materials and Testing," SAE International, 2, pp. 205, (2000).
Troughton, "Handbook of Plastics Joining—A Practical Guide: Chapter 17 A160—Adhesive Bonding," William Andrew Publishing, 2, pp. 145-173, (2008).

\* cited by examiner

Figure for S06 where A is the fiber, B is the matrix and C is the woven material, note there is no top or bottom coating.

Figure for S07 and S13 where A is the fiber and B is the matrix material.
C in this Figure preferably comprises a waterproof non-breathable urethane film.

ENGINEERED COMPOSITE SYSTEMS

CROSS-REFERENCE TO RELATED APPLICATIONS

This application claims priority to U.S. Provisional Patent Application Ser. No. 61/780,345 filed Mar. 13, 2013.

BACKGROUND OF THE INVENTION

Related disclosures are found in U.S. Pat. No. 5,470,062, entitled "COMPOSITE MATERIAL FOR FABRICATION OF SAILS AND OTHER ARTICLES," which was issued on Nov. 28, 1995; and U.S. Pat. No. 5,333,568, entitled "MATERIAL FOR THE FABRICATION OF SAILS" which was issued on Aug. 2, 1994; and U.S. patent application Ser. No. 13/168,912, filed Jun. 24, 2011 entitled "WATERPROOF BREATHABLE COMPOSITE MATERIALS FOR FABRICATION OF FLEXIBLE MEMBRANES AND OTHER ARTICLES,"; and U.S. patent application Ser. No. 13/197,741, filed Aug. 3, 2011 entitled "SYSTEM AND METHOD FOR THE TRANSFER OF COLOR AND OTHER PHYSICAL PROPERTIES TO LAMINATE COMPOSITE MATERIALS AND OTHER ARTICLES", the contents of all of which are hereby incorporated by reference for any purpose in their entirety.

This invention relates to improved flexible composite systems. More particularly, this invention relates to a system for quickly and economically producing high-quality engineered-composite materials exhibiting enhanced "stretch" properties, or modulus attained, or rebound ability. Such composites would be of benefit within many technical fields.

Further, this invention relates to providing improved monofilament-related products, methods, and equipment. More particularly, this invention relates to providing systems for design and manufacture of products using the technologies and useful arts herein taught and embodied. Even more particularly, this invention provides improvements in efficiently controlling properties of fabric-related products, including but not limited to: weight, rigidity, penetrability, waterproof-ability, breathability, color, moldability, cost, customizability, flexibility, package-ability, etc., including desired combinations of such properties.

In the past, there has been difficulty in achieving desired combinations of such properties, especially with regard to fabric-related products like clothing and shoes, camping and hiking goods, comfortable armor, protective inflatables, etc.

OBJECTS AND FEATURES OF THE INVENTION

A primary object and feature of the present invention is to provide a system overcoming the above-mentioned problem.

Another primary object and feature of the present invention is to provide a system to fine-tune, at desired places on a product, directional control of rigidity/flexibility/elasticity properties.

Yet another primary object and feature of the present invention is to provide products combining extreme light weight with extreme strength.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a laminate including reinforcing elements therein, such reinforcing elements including at least one unidirectional tape having monofilaments therein, all of such monofilaments lying in a predetermined direction within the tape, wherein such monofilaments have diameters less than 20 microns and wherein spacing between individual monofilaments within an adjoining strengthening group of monofilaments is within a gap distance in the range between non-abutting monofilaments up to nine times the monofilament major diameter.

Moreover, it provides such a laminate wherein such monofilaments are extruded. Additionally, it provides such a laminate wherein such reinforcing elements include at least two unidirectional tapes, each having extruded monofilaments therein, all of such monofilaments lying in a predetermined direction within the tape, wherein such monofilaments have diameters less than 20 microns and wherein spacing between individual monofilaments within an adjoining strengthening group of monofilaments is within a gap distance in the range between non-abutting monofilaments up to nine times the monofilament major diameter. Also, it provides such a laminate wherein each of such at least two unidirectional tapes includes larger areas without monofilaments therein and wherein such larger areas comprise laminar overlays comprising smaller areas without monofilaments.

In addition, it provides such a laminate wherein such smaller areas comprise user-planned arrangements. And, it provides such a laminate further comprising a set of water-breathable elements comprising laminar overlays of such smaller areas. Further, it provides such a laminate further comprising a set of other laminar overlays. Moreover, it provides such a laminate wherein a first one of such at least two unidirectional tapes includes monofilaments lying in a different predetermined direction than a second one of such at least two unidirectional tapes.

Additionally, it provides such a laminate wherein a combination of the different predetermined directions of such at least two unidirectional tapes is user-selected to achieve laminate properties having planned directional rigidity/flexibility. Also, it provides such a laminate comprising a three-dimensionally shaped, flexible composite part. In addition, it provides such a product comprising multiple laminate segments attached along peripheral joints. And, it provides such a product comprising at least one laminate segment attached along peripheral joints with at least one non-laminate segment. Further, it provides such a product comprising multiple laminate segments attached along area joints.

Even further, it provides such a product comprising at least one laminate segment attached along area joints with at least one non-laminate segment. Moreover, it provides such a product comprising at least one laminate segment attached along area joints with at least one unitape segment. Additionally, it provides such a product comprising at least one laminate segment attached along area joints with at least one monofilament segment. Also, it provides such a product further comprising at least one rigid element.

In accordance with another preferred embodiment hereof, this invention provides a product wherein such at least one unidirectional tape is attached to such product. In accordance with a preferred embodiment hereof, the present system provides each and every novel feature, element, combination, step and/or method disclosed or suggested by this patent application.

BRIEF GLOSSARY OF TERMS AND DEFINITIONS

Adhesive: A curable resin used to combine composite materials.

Anisotropic: Not isotropic; having mechanical and or physical properties which vary with direction at a point in the material.

Aerial Weight: The weight of fiber per unit area, this is often expressed as grams per square meter (g/m²).

Autoclave: A closed vessel for producing an environment of fluid pressure, with or without heat, to an enclosed object which is undergoing a chemical reaction or other operation.

BRIEF DESCRIPTION OF THE DRAWING FIGURES

Figure 1B:
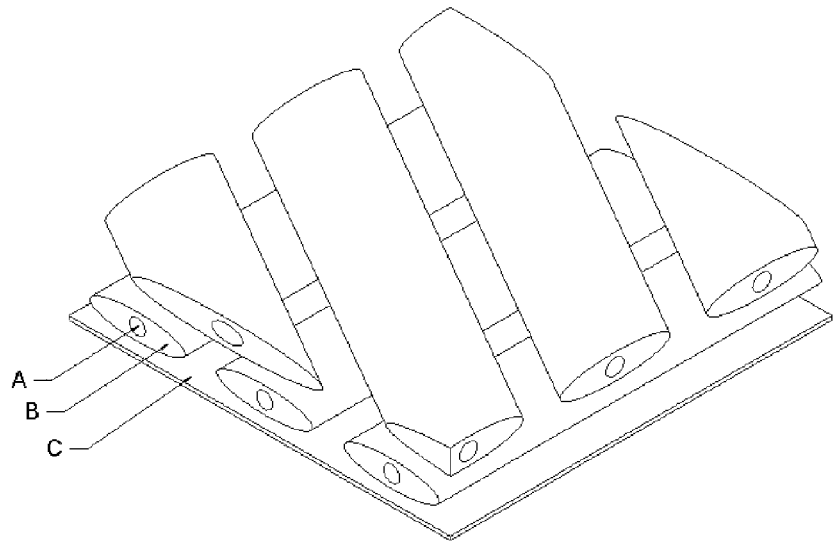

FIG. 1A is an illustration of S06 where A is the fiber, B is the matrix and C is the woven material, note there is no top or bottom coating; and FIG. 1B is an illustration of S07 and S13 where A is the fiber and B is the matrix material, C in this Figure preferably comprises a waterproof non-breathable urethane film.

TABLE (1)

DETAILED DESCRIPTION

| Comments | Sample Number | Sample Delamination rank after 1/2 hour wash/ durability | translucence | weight (gsm) | Layer 1 | Layer 2 | Layer 3 | Layer 4 | Layer 5 | Additional comments |
|---|---|---|---|---|---|---|---|---|---|---|
| white woven inner layer no outer coatings and natural color, 0/90 fibers, moderate air permeable | S06 | 3 | 4 | 64 | release liner removed after process | #5380° | WHC 2 | #53890° | release liner removed after process | Non-waterproof breathable |
| no coating one side, coated on the other, 0/60 fiber, natural color | S07 | 5 | 4 | 92 | W2-1.0 | #5380° | #5380° | release liner removed after process | | Waterproof Non-breathable |
| no coating one side, coated on the other, 0/60 fiber, grey | S13 | 4 | 4 | 90 | W2-1.0 | #1420° | #14260° | release liner removed after process | | Waterproof Non-breathable |

B-stage: Generally defined herein as an intermediate stage in the reaction of some thermosetting resins. Materials are sometimes pre cure to this stage, called "prepregs", to facilitate handling and processing prior to final cure.

C-stage: Final stage in the reaction of certain resins in which the material is relatively insoluble and infusible.

Cure: To change the properties of a polymer resin irreversibly by chemical reaction. Cure may be accomplished by addition of curing (cross-linking) agents, with or without catalyst, and with or without heat.

Decitex (DTEX): Unit of the linear density of a continuous filament or yarn, equal to ⅒th of a tex or 9/10th of a denier Dyneema™ Ultra-high-molecular-weight polyethylene fiber by DSM Filament: The smallest unit of a fiber-containing material. Filaments usually are of long length and small diameter.

Polymer: An organic material composed of molecules of monomers linked together.

Prepreg: A ready-to-cure sheet or tape material. The resin is partially cured to a B-stage and supplied to a layup step prior to full cure.

Tow: An untwisted bundle of continuous filaments.

UHMWPE: Ultra-high-molecular-weight polyethylene. A type of polyolefin made up of extremely long chains of polyethylene. Trade names include Spectra® and Dyneema®

Unitape Uni-Directional tape (UD tape)—flexible reinforced tapes (also referred to as sheets) having uniformly-dense arrangements of reinforcing fibers in parallel alignment and impregnated with an adhesive resin. UD tape are typically B-staged and form the basic unit of most CT composite fabrics.

Each of the materials of Table (1) preferably utilize Unitape layers. A preferred Unitape layers is preferably manufactured by spreading fibers and coating them with an adhesive to form a substantially continuous sheet. The preferred Unitape layers are non-woven.

More specifically, each of the flexible sheet materials of Table (1) preferably utilizes Unitape layers (either applicant's #538 or #142 Unitape). Preferably, these unitape "sheets" are cut to size and laid in multiple orientations to form a preferred two directional fiber reinforced sheet. Each of the materials of Table (1) preferably utilize Unitape layers (either #538 or #142) with following preferred characteristics:

About 14 gsm of non-breathable CT71 adhesive in the unitape and 14 gsm of Dyneema SK75 1760Dtex fiber, which, when cross plied, preferably creates a fiber matrix network that will bead water and will be air permeable but will allow water to pass through with significant atmospheric pressure.

Unitape #142 has a small amount of light grey tint in the CT71 adhesive that makes the resulting products have a light grey color.

Unitape #538 is natural colored (translucent pale yellow) so the resulting products are translucent pale yellow.

As illustrated in FIGS. 1A and 1B, laminate S06 has no film or membrane on either side of the laminate but has the woven material we have coded as WHC2 (Nylon 6 ripstop, 10 d×10 d+30 d, 255×218, 26 g/sqm, C6:DWR) sandwiched between the unitape layers, the purpose of the woven is to add rip-stop performance to the laminate and add structural stability to the laminate. This material is a typical 0/90° orientation but has lower than normal modulus in the +/−45° directions because of the lack of film or membrane Laminate S07 does not have a film or membrane on one side but has a non-breathable urethane membrane film W2-1.0 on the other side so that it is waterproof-non breathable with fibers laid at about 0° and 60° so the material (through the combination of the fiber angles and stretchable film) has low modulus in the 120° direction and moderate modulus in the 30° direction Laminate S13 is same as S07 but is light grey because of the unitape used.

The "membrane-free" flexible composite generally exhibits greater "stretch", or modulus attained, or rebound ability (of the materials in the non-fiber reinforced directions), when compared to applicant's prior-disclosed embodiments (see U.S. Pat. No. 5,470,632 to Heiner Meldner et al). Applicant's new disclosed embodiments are preferably designed to have a low modulus or rebound in the off axis directions.

It is noted that applicant's preferred adhesive coating (CT71) is preferably a partially thermosetting polymer that has excellent adhesion to low surface energy fibers (and films, as applicable) and forms a toughened finished product once cured that is puncture resistant and resists UV degradation. Upon reading this specification, those with ordinary skill in the art will now appreciate that, under appropriate circumstances, considering such issues as design preference, intended use, cost, structural requirements, available materials, technological advances, etc., other laminate versions, such as, for example, a non-breathable membrane applied on one or both sides of the layup assembly, which preferably could be replaced with breathable membranes.

In another preferred embodiment of the present invention, materials have an engineered stretch wherein the finished material stretch and rebound and design directions may be used in designed amounts. For example, a flexible composite with a high modulus from initial strain in the X-Y plain directions 0°/180°, 90°/270°, and 45°/225° but lower strengths, from initial strain, in all other x-y plane directions.

Preferably, the initial modulus of the material drops off as the direction of stress moves farther and farther from a fiber reinforced direction and increases as the load moves back towards a fiber reinforced direction. By knowing the material characteristics of each component ply and the interaction effects they have with each other a material can be manufactured with particular characteristics that may be drastically different than the constituent components.

The following table discloses Unitape layers (applicant's #538 Unitape). Preferably, these unitape "sheets" are cut to size and laid in multiple orientations to form a preferred multi-directional fiber reinforced sheet. Each of the materials of Table (2) preferably utilize Unitape layers (either #538) in angular orientation (0-degrees; 45-degrees) with following preferred characteristics, as shown:

More specifically, each of the flexible sheet materials of the above Table 2 preferably utilizes Unitape layers (applicant's #538 Unitape). Preferably, these unitape "sheets" are cut to size and laid in multiple orientations to form a preferred three directional fiber reinforced sheet. Each of the materials of Table (1) preferably utilize Unitape layers (#538) with the following preferred characteristics:

About 14 gsm of non-breathable CT71 adhesive in the unitape and 14 gsm of Dyneema SK75 1760Dtex fiber, which, when cross plied, preferably creates a fiber matrix network that will bead water and will be air permeable but will allow water to pass through with significant atmospheric pressure.

Unitape #538 may include additives that cause it to become colored to inventors desire Unitape #538 is natural colored (translucent pale yellow) so the resulting products are translucent pale yellow.

Additionally, as illustrated above, laminate S40 preferably has a non-breathable weldable urethane film W6-2.0 on both the bottom and top surfaces and three layers of #538 unitape. This material is a 0/+45/−45' unitape orientation and has low modulus in 90° directions because of the lack of fiber in that direction.

Laminate S45 preferably has a tricot knit on one side for added abrasion resistance and a non-breathable urethane membrane film W6-2.0 on the other side so that the laminate is waterproof-non breathable with fibers laid at about O" +45°, and −45° so the material (through the combination of the fiber angles and stretchable film and stretchable tricot) has low modulus in the 90' direction.

Additional alternative surface coatings may include various types of knits, wovens, non-wovens, meshes, breathable films (porous and non porous), multilayered films, foams. Preferably, adding various materials, as noted, into the stack of plies in configurations other than described for instance: having a woven material between layers of unitape; having a film layer between unitape plies; having a woven material and a weldable film layer between two plies of unitape etc, may suffice.

Further, other preferred alternative fiber angles could be used to drive high modulus in fiber reinforced directions and low modulus in non-fiber reinforced directions (assuming flexible matrix and other non-fiber components are also low-modulus).

Upon reading this specification, those with ordinary skill in the art will now appreciate that, under appropriate circumstances, considering such issues as design preference, user preferences, marketing preferences, cost, structural requirements, available materials, technological advances, etc., other material arrangements such as, for example, material could be cured inside or outside an autoclave, exact

| Product name | Sample Number | Aprox. weight (gsm) | Layer 1 | Layer 2 | Layer 3 | Layer 4 | Layer 5 |
|---|---|---|---|---|---|---|---|
| CT9BW6-2.0 (45) | S40 | 215 | W6-2.0 | #538 0° | #538 45° | #538 −45° | W6-2.0 |
| CT9BW2-1.0/TR1 (45) | S45 | 163 | Tricot knit (any | #538 0° | #538 45° | #538 −45° | W2-1.0 |

Preferably, each of the materials above preferably utilize Unitape layers. Preferred Unitape layers are preferably manufactured by spreading fibers and coating them with an adhesive to form a substantially continuous sheet. The preferred Unitape layers are non woven.

material unitapes and other components may be changed to control the modulus of the material in off and on fiber axis directions, etc., may suffice.

And, upon reading this specification, those with ordinary skill in the art will now appreciate that, under appropriate circumstances, considering such issues as design preference, user preferences, marketing preferences, cost, structural requirements, available materials, technological advances, etc., other adhesive arrangements such as, for example, removing current surface coatings and utilizing ct71 to be both the adhesive and the coating, etc., may suffice. Alternately preferably, no adhesive may be needed if the fibers are weldable to themselves and/or the surface coatings.

Further, upon reading this specification, those with ordinary skill in the art will now appreciate that, under appropriate circumstances, considering such issues as design preference, user preferences, marketing preferences, cost, structural requirements, available materials, technological advances, etc., other materials and layering arrangements to improve performance and usability, such as those indicated below, may suffice:

i. Resin
 1. toughening agents
 2. breathable adhesive
 3. non-breathable adhesive
 4. FR additives
 5. No-stink additives
 6. Other resins
   a. Water based
   b. PU's
ii. thin films
 1. breathable film
 2. non breathable
 3. directionally strong films
iii. texture could be added
iv. abrasion layers
 1. woven nylon
 2. woven polyester
 3. non-wovens
 4. super fabric
v. non-woven layers
 1. on outer surface
 2. between plies
vi. unitape fiber
 1. fiber types
   a. aramid
   b. para aramid
   c. Liquid Crystal Polymers
   d. UHMEPE
   e. Polyesters
   f. Polyamides (Nylons)
   g. Polybenzimidazole
 2. Resin content
   a. Increased
   b. Decreased
 3. Amount of fiber
   a. Increased
   b. Decreased
 4. Unitape Fiber hybrids
   a. Intra laminar
   b. Inter laminar
vii. Ply count can change
viii. Unitape per ply can change
ix. Unitape directions can change And, upon reading this specification, those with ordinary skill in the art will now appreciate that, under appropriate circumstances, considering such issues as design preference, user preferences, marketing preferences, cost, structural requirements, available materials, technological advances, etc., other uses such as, for example, medical bracing, safety devices (fall straps), etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A waterproof, non-breathable flexible laminate comprising:
 (a) a first unidirectional tape layer comprising monofilaments coated in an adhesive, all of said monofilaments lying in a first predetermined direction;
 (b) a second unidirectional tape layer comprising monofilaments coated in an adhesive, all of said monofilaments lying in a second predetermined direction, said second unidirectional tape layer bonded to said first unidirectional tape layer;
 (c) a third unidirectional tape layer comprising monofilaments coated in an adhesive, all of said monofilaments lying in a third predetermined direction, said third unidirectional tape layer bonded to said second unidirectional tape layer;
 (d) a stretchable non-breathable urethane membrane film bonded to said first unidirectional tape layer opposite said second unidirectional tape layer; and
 (e) a stretchable tricot knit layer bonded to said third unidirectional tape layer opposite said second unidirectional tape layer,
 wherein said monofilaments have diameters less than 20 microns; and wherein individual monofilaments abut adjacent monofilaments or wherein spacing between individual monofilaments within an adjoining strengthening group of monofilaments is within a gap distance in the range between non-abutting monofilaments up to nine times the monofilament major diameter.

2. The laminate of claim 1, wherein said first and second unidirectional tape layers are oriented relative to one another such that said second predetermined direction is 45° relative to said first predetermined direction, and wherein said second and third unidirectional tape layers are oriented relative to one another such that said third predetermined direction is 90° relative to said second predetermined direction, and wherein said laminate exhibits low modulus when stretched in a direction +90° or −90° relative to said first predetermined direction.

3. The laminate of claim 1, wherein said monofilaments comprise ultra-high molecular weight polyethylene.

4. The laminate of claim 3, wherein each of said unidirectional tape layers comprises from about 12 gsm to about 16 gsm non-breathable adhesive and from about 12 gsm to about 16 gsm ultra-high molecular weight polyethylene monofilaments.

5. The laminate of claim 3 having added abrasion resistance on the side possessing the stretchable tricot knit layer.

6. The laminate of claim 1, wherein first, second and third unidirectional tape layers include smaller areas absent monofilaments.

7. The laminate of claim 6, further comprising larger areas absent monofilaments, wherein said larger areas comprise laminar overlays of said smaller areas of said unidirectional tape layers absent monofilaments.

8. The laminate of claim 1, wherein said adhesive in each of said first, second and third unidirectional tape layers comprises a partially thermosetting, waterproof breathable polymer, such that each of said unidirectional tape layers are waterproof and air-permeable.

9. The laminate of claim 1, wherein said monofilaments in each of said unidirectional tape layers are extruded.

10. A waterproof, non-breathable flexible laminate comprising:
  (a) a first unidirectional tape layer comprising monofilaments coated in an adhesive, all of said monofilaments lying in a first predetermined direction;
  (b) a second unidirectional tape layer comprising monofilaments coated in an adhesive, all of said monofilaments lying in a second predetermined direction, said second unidirectional tape layer bonded to said first unidirectional tape layer;
  (c) a third unidirectional tape layer comprising monofilaments coated in an adhesive, all of said monofilaments lying in a third predetermined direction, said third unidirectional tape layer bonded to said second unidirectional tape layer;
  (d) a stretchable non-breathable urethane membrane film bonded to said first unidirectional tape layer opposite said second unidirectional tape layer; and
  (e) a stretchable tricot knit layer bonded to said third unidirectional tape layer opposite said second unidirectional tape layer, wherein each of said first, second and third predetermined directions are different.

11. The laminate of claim 10, wherein said first and second unidirectional tape layers are oriented relative to one another such that said second predetermined direction is 45° relative to said first predetermined direction, and wherein said second and third unidirectional tape layers are oriented relative to one another such that said third predetermined direction is 90° relative to said second predetermined direction, and wherein said laminate exhibits low modulus when stretched in a direction+90° or −90° relative to said first predetermined direction.

12. The laminate of claim 10, wherein said monofilaments have diameters less than 20 microns; and wherein individual monofilaments abut adjacent monofilaments or wherein spacing between individual monofilaments within an adjoining strengthening group of monofilaments is within a gap distance in the range between non-abutting monofilaments up to nine times the monofilament major diameter.

13. The laminate of claim 10, wherein said adhesive in each of said first, second and third unidirectional tape layers comprises a partially thermosetting, waterproof breathable polymer, such that each of said unidirectional tape layers are waterproof and air-permeable.

14. The laminate of claim 10, wherein said monofilaments in each of said first, second and third unidirectional tape layers comprise ultra-high molecular weight polyethylene.

15. The laminate of claim 12, further comprising larger areas absent monofilaments, wherein said larger areas comprise laminar overlays of portions of said unidirectional tape layers absent monofilaments.

16. A waterproof flexible laminate comprising:
  (a) a first unidirectional tape layer comprising monofilaments coated in an adhesive, all of said monofilaments lying in a first predetermined direction;
  (b) a second unidirectional tape layer comprising monofilaments coated in an adhesive, all of said monofilaments lying in a second predetermined direction, said second unidirectional tape layer bonded to said first unidirectional tape layer;
  (c) a third unidirectional tape layer comprising monofilaments coated in an adhesive, all of said monofilaments lying in a third predetermined direction, said third unidirectional tape layer bonded to said second unidirectional tape layer;
  (d) a stretchable urethane membrane film bonded to said first unidirectional tape layer opposite said second unidirectional tape layer; and
  (e) a stretchable tricot knit layer bonded to said third unidirectional tape layer opposite said second unidirectional tape layer,
  wherein said monofilaments have diameters less than 20 microns; and wherein individual monofilaments abut adjacent monofilaments or wherein spacing between individual monofilaments within an adjoining strengthening group of monofilaments is within a gap distance in the range between non-abutting monofilaments up to nine times the monofilament major diameter.

17. The laminate of claim 16, wherein said stretchable urethane membrane film is non-breathable.

18. The laminate of claim 16, wherein said stretchable urethane membrane film is breathable.

19. The laminate of claim 16, wherein said adhesive in each of said first, second and third unidirectional tape layers comprises a partially thermosetting, waterproof breathable polymer, such that each of said unidirectional tape layers are waterproof and air-permeable.

20. The laminate of claim 16, wherein said monofilaments in each of said first, second and third unidirectional tape layers comprise ultra-high molecular weight polyethylene.

21. The laminate of claim 16, wherein said first and second unidirectional tape layers are oriented relative to one another such that said second predetermined direction is 45° relative to said first predetermined direction, and wherein said second and third unidirectional tape layers are oriented relative to one another such that said third predetermined direction is 90° relative to said second predetermined direction, and wherein said laminate exhibits low modulus when stretched in a direction+90° or −90° relative to said first predetermined direction.

22. A waterproof flexible laminate comprising:
  (a) a first unidirectional tape layer comprising monofilaments coated in an adhesive, all of said monofilaments lying in a first predetermined direction;
  (b) a second unidirectional tape layer comprising monofilaments coated in an adhesive, all of said monofilaments lying in a second predetermined direction, said second unidirectional tape layer bonded to said first unidirectional tape layer;
  (c) a stretchable urethane membrane film bonded to said first unidirectional tape layer opposite said second unidirectional tape layer; and
  (d) a stretchable tricot knit layer bonded to said second unidirectional tape layer opposite said first unidirectional tape layer,
  wherein said first and second unidirectional tape layers are oriented relative to one another such that said second predetermined direction is 90° relative to said first predetermined direction, and wherein said laminate exhibits low modulus when stretched in a direction+45° or −45° relative to said first predetermined direction.

23. The laminate of claim 22, wherein said stretchable urethane membrane film is non-breathable.

24. The laminate of claim 22, wherein said stretchable urethane membrane film is breathable.

25. The laminate of claim 22, wherein said monofilaments in each of said first and second unidirectional tape layers comprise ultra-high molecular weight polyethylene, and wherein said adhesive in each of said first and second unidirectional tape layers comprises a partially thermosetting, waterproof breathable polymer, such that each of said first and second unidirectional tape layers are waterproof and air-permeable.

* * * * *